United States Patent [19]

Kurokawa et al.

[11] Patent Number: 5,224,082

[45] Date of Patent: Jun. 29, 1993

[54] METHOD FOR DETECTING TRACKING ERROR IN OPTICAL DISK SYSTEM AND ITS OPTICAL SYSTEM DEVICES THEREOF

[75] Inventors: Kaneyuki Kurokawa, Tokyo; Masayuki Kato; Satoshi Maeda, both of Atsugi; Fumio Yamagishi, Ebina; Hiroyuki Ikeda, Yokohama, all of Japan

[73] Assignee: Fujitsu Limited, Kawasaki, Japan

[21] Appl. No.: 830,753

[22] Filed: Feb. 6, 1992

Related U.S. Application Data

[63] Continuation of Ser. No. 07/315,840, Feb. 27, 1989, abandoned.

[30] Foreign Application Priority Data

Feb. 26, 1988 [JP] Japan ................. 63-043585
Jul. 26, 1988 [JP] Japan ................. 63-186245

[51] Int. Cl.⁵ .......................................... G11B 7/09
[52] U.S. Cl. ................................. 369/44.23; 369/112
[58] Field of Search ............... 369/44.37, 109, 112, 369/44.38, 44.41, 44.42, 44.23, 100, 116, 121, 122, 44.12, 44.14, 110, 275.1; 359/569, 572, 573

[56] References Cited

U.S. PATENT DOCUMENTS

| | | | |
|---|---|---|---|
| 4,532,522 | 7/1985 | Tsunoda et al. | 369/44.38 |
| 4,686,663 | 8/1987 | Kiihn | 369/44.37 |
| 4,817,072 | 3/1989 | Toide et al. | 369/109 |
| 4,993,011 | 2/1991 | Torazawa et al. | 369/112 |
| 5,018,127 | 5/1991 | Ando | 369/112 |
| 5,033,040 | 7/1991 | Fujita | 369/112 |
| 5,070,488 | 12/1991 | Fukushima et al. | 369/110 |

FOREIGN PATENT DOCUMENTS

| | | |
|---|---|---|
| 0096881A3 | 6/1983 | European Pat. Off. |
| 0228620A3 | 9/1986 | European Pat. Off. |
| 60-236123 | 5/1984 | Japan . |
| 60-182523 | 9/1985 | Japan . |
| 61-230634 | 10/1986 | Japan . |

*Primary Examiner*—Aristotelis Psitos
*Assistant Examiner*—Nabil Hindi
*Attorney, Agent, or Firm*—Staas & Halsey

[57] ABSTRACT

A method for detecting a tracking error in a process of tracking a groove track on a recording medium includes the steps of: irradiating a first light spot onto a groove track on a recording medium as a focused light beam for carrying out recording, reproducing, or erasing of information on the groove track of the recording medium; and irradiating a second and a third light spots onto an area around the groove track on the recording medium as focused light beams simultaneously with the irradiation of the first light spot, the second and third light spots are irradiated onto an area around the groove track on one side of the first light spot in a manner such that each of the second and third light spots covers both an inside and outside of the groove track.

7 Claims, 16 Drawing Sheets

Fig. 1A — LIGHT BEAM ALIGNED WITH PRE-GROOVE
Fig. 1B — LIGHT BEAM NOT ALIGNED WITH PRE-GROOVE
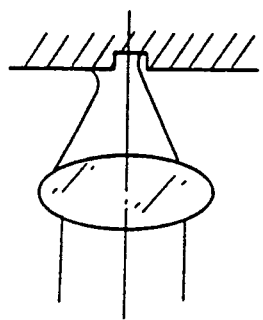
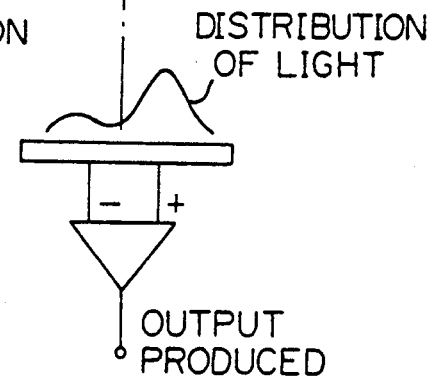
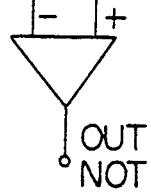
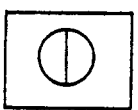
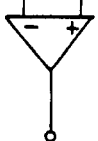
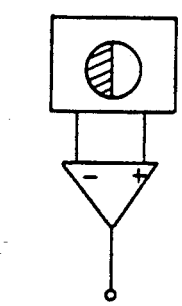

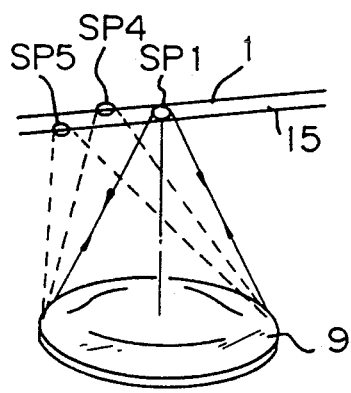
Fig. 8
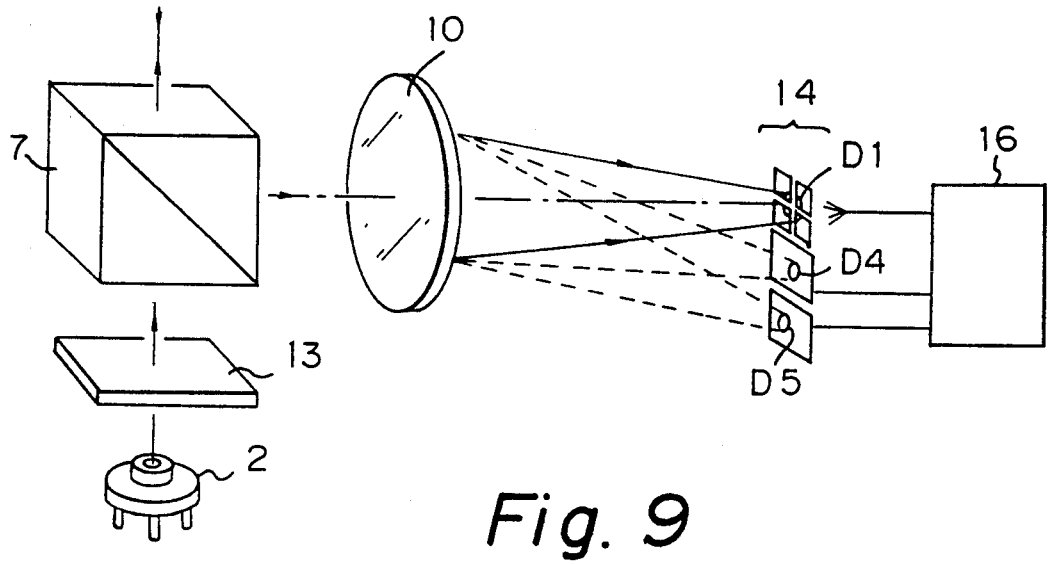
Fig. 9
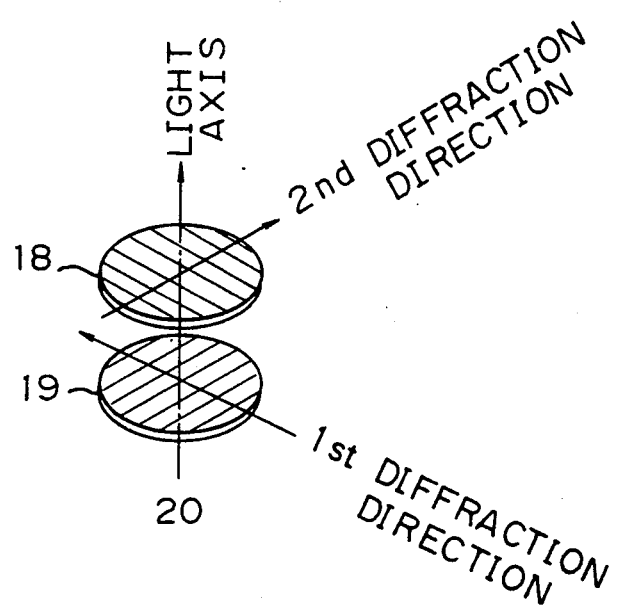

RUGGED SURFACE TYPE

VOLUMETRIC TYPE

INTEGRATED TYPE

MULTIPLE LAYER TYPE

Fig. 19
ONE-INTERFERENCE BETWEEN
THREE LIGHT BEAMS
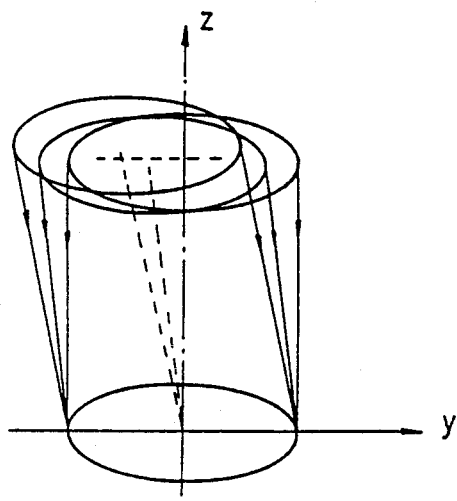
Fig. 20A
TWO-INTERFERENCE BETWEEN
TWO LIGHT BEAMS
Fig. 20B
TWO-INTERFERENCE BETWEEN
TWO LIGHT BEAMS
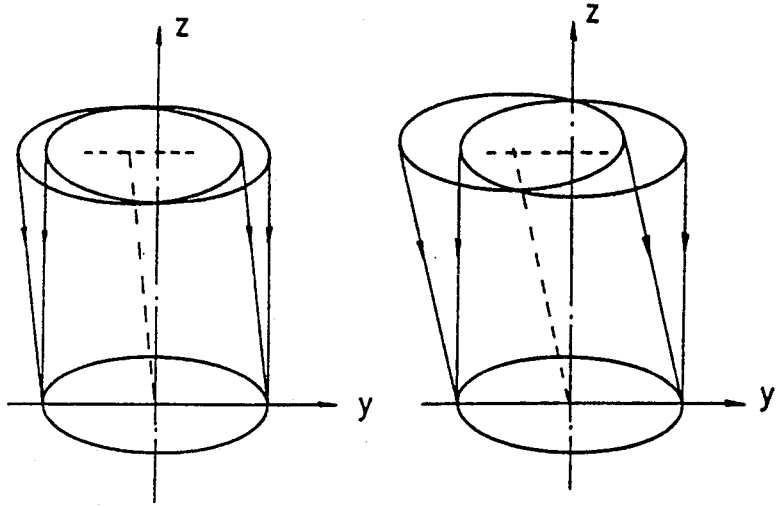

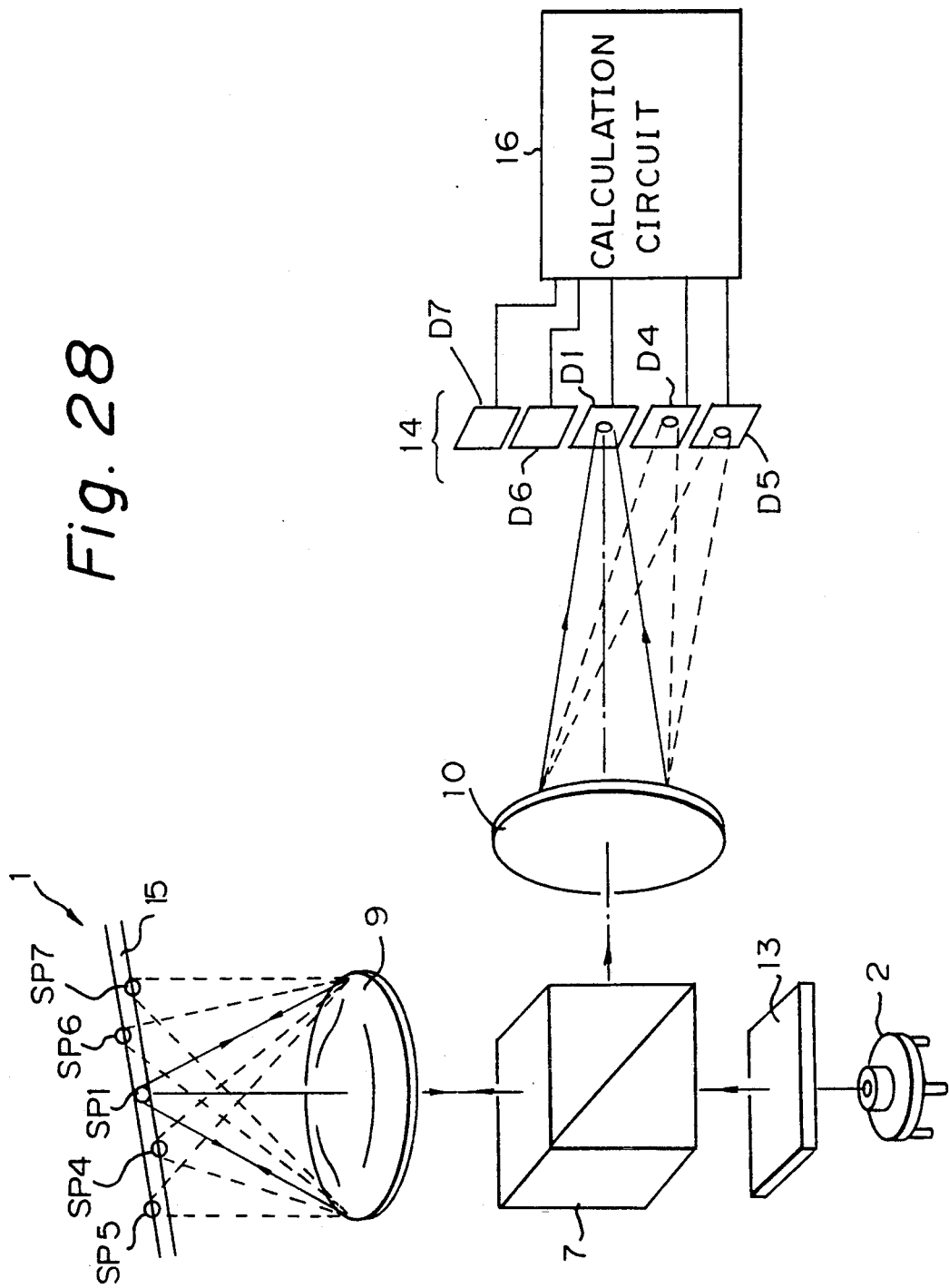

FORCUSING ERROR DETECTION

Fig. 35    Fig. 36    Fig. 37
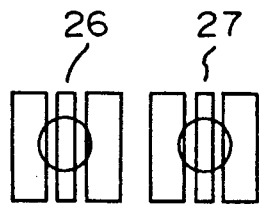 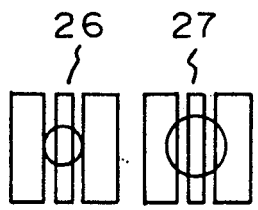 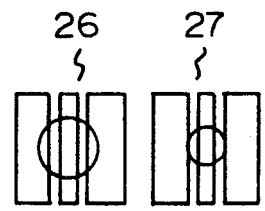
Fig. 38    Fig. 39
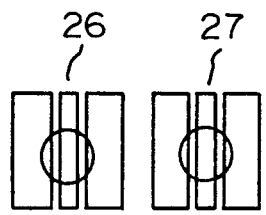 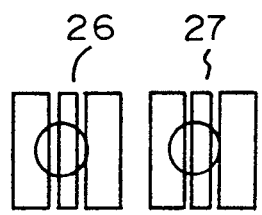
Fig. 40
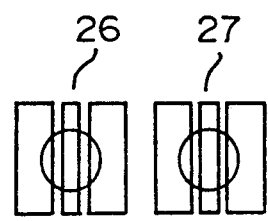

METHOD FOR DETECTING TRACKING ERROR IN OPTICAL DISK SYSTEM AND ITS OPTICAL SYSTEM DEVICES THEREOF

This application is a continuation of application Ser. No. 07/315,840, filed Feb. 27, 1989, now abandoned.

BACKGROUND OF THE INVENTION

1. Field of the Invention

The present invention relates to a tracking error detection method applicable commonly to an optical disk medium for different recording systems, and a diffraction grating and a photodetector for use in the above detection method.

2. Description of the Related Art

In general, in prior art optical disk recording systems, when information is read out after being recorded, due to the fact that an apparatus in the system detects errors such as when a laser beam spot cannot trace a normal track or a groove, there is a conventional tracking error detection method which employs error detecting spots before and after each main spot for recording and reading in addition to the main spots. But since this method has the disadvantage of not being applicable to a phase variation type optical disk or an additional storage type optical disk, it has long been desired to develop more advanced tracking error detection system technology which can be utilized for the numerous types of optical disks in common use.

In general, a microspot of a laser beam projected by an optical head is irradiated onto a predetermined track of a rotary optical disk recording medium to effect recording and reproducing of data. The laser beam spot must always remain on the track. Since the track is often displaced due to an inclination of an optical path based on the rotation of the disk, it is necessary to have the laser beam spot follow the displacement. The follow means consists of detecting a shift of the irradiation position of the spot and mechanically moving an objective lens used for the laser beam. The detection of the shift of the spot irradiation position is referred to as detection of a tracking error.

In a prior art, a push-pull method or a three-beam method has been employed as tracking error detection methods, but neither of them is completely satisfactory.

SUMMARY OF THE INVENTION

It is an object of the present invention to provide an advanced method for solving the problems of the prior art tracking error detection method in which a tracking error is detected by three laser beams, a second spot and a third spot are disposed on one side of a first spot to detect the tracking error.

It is another object of the invention to provide a new method in which, when the production of a focusing error is undesirable, an inclination of an optical disk will not interfere with the focusing error detection process.

In accordance with the present invention, there is provided, as a specific feature of the invention, a method for detecting a tracking error in a process of tracking a groove track on a recording medium including the steps of: irradiating a first light spot onto a groove track on a recording medium as a focused light beam for recording, reproducing, or erasing information on the groove track of the recording medium; irradiating a second and a third light spot onto an area around the groove track on the recording medium as focused light beams simultaneously with the irradiation of the first light spot, the second and third light spots being irradiated onto an area around the groove track on one side of the first light spot in such a manner that each of the second and third light spots covers both an inside and outside of the groove track; optically detecting, by a plurality of photodetectors, light from the first, second, and third light spots reflected from the recording medium; and determining a tracking error in a process of tracking the groove track by a calculation using the results of the optical detection by the plurality of photodetectors.

In accordance with the present invention, there is provided, as another feature of the invention, an apparatus for detecting a tracking error in a process for tracking a groove track on a recording medium including: a recording medium having a groove track in the surface thereof; a light source for producing light emissions to be irradiated onto the recording medium; irradiation means for irradiating a first, second, and third light spots onto an area around the groove track on the recording medium, the first light spot being irradiated onto a groove track as a focused light emission for recording reproducing, or erasing information on the groove track of the recording medium, the second and third light spots being irradiated onto an area around the groove track on the recording medium as focused of light beams, the second and third light spots being irradiated onto an area around the groove track on one side of the first light spot in such a manner that each of the second and third light spots covers both an inside and outside of the groove track; a plurality of photodetectors for detecting reflected light beams of the first, second, and third light spots reflected from the recording medium; and calculation means for determining a tracking error for use in a process of tracing the groove track by use of calculation based on the results of the detection by the plurality of photodetectors.

As a further feature of the present invention, there is provided a method for detecting a tracking error and a focusing error in a process of tracking a groove track on a recording medium including the steps of: irradiating a first light spot onto a groove track on a recording medium as a focused light beam for recording, reproducing, or erasing information on the groove track of the recording medium; irradiating a second and third light spots as a first light spot group, and a fourth and fifth light spots, as a second light spot group, onto an area around the groove track on the recording medium as focused light beams simultaneously with the irradiation of the first light spot, the second to fifth light spots being irradiated onto an area around the groove track in such a manner that the spots belonging to one light spot group are irradiated on one side of the first light spot, that the groove portion and the non-groove portion are discriminated, that a focused light spot and a non-focused light spot are discriminated, and that each of the second to fifth light spots covers both the inside and outside of the groove track; optically detecting, by a plurality of photodiodes, lights of the first to fifth light spots reflected from the recording medium; and determining a tracking error and a focusing error in a process of tracing the groove track using a calculation based on the results of the optical detection by the plurality of photodetectors.

BRIEF DESCRIPTION OF THE DRAWINGS

In the drawings, FIG. 1 illustrates a prior art push-pull tracking error detection method;

FIG. 8 shows an apparatus for effecting a tracking error detection method according to an embodiment of the present invention;

FIG. 9 shows the constitution of diffraction gratings, utilized in the apparatus in FIG. 8;

FIGS. 19 and 20 illustrate the manufacture of diffraction gratings;

FIG. 28 is a diagram showing an apparatus effecting a tracking error detection method as another embodiment of the present invention;

FIGS. 35 to 37 are diagrams showing each signal display method when a focusing error is detected;

FIGS. 38 and 39 are diagrams showing a detection signal with or without an inclination;

FIG. 40 is a diagram showing a detection signal when a double refraction occurs on the surface of a disk.

DESCRIPTION OF THE PREFERRED EMBODIMENT

Before describing an embodiment of the present invention, a prior art tracking error detection method will be described with reference to FIGS. 1 to 7.

A push-pull method for detection of a tracking error as a prior art is illustrated in FIG. 1. In this method, a reflected light from an optical disk is input in a photodetector which is divided into two parts (that is, an upper part and a lower part). The difference between the outputs of each detector is then studied and a method is used to regulate the irradiation position of the spot in order to lessen the above difference. Also, since in the push-pull method, even if there is no track shift, the position of the spots on the photodetector changes when the disk inclines, and it is sometimes erroneously judged that a tracking error has occurred. This dynamic inclination of a disk is referred to as a flat-disk vibrato.

A three-beam method, as shown in FIGS. 2 to 7, is utilized as a countermeasure to the occurrence of an inclination of an optical disk in the prior art tracking error detection methods.

Figure 2A:
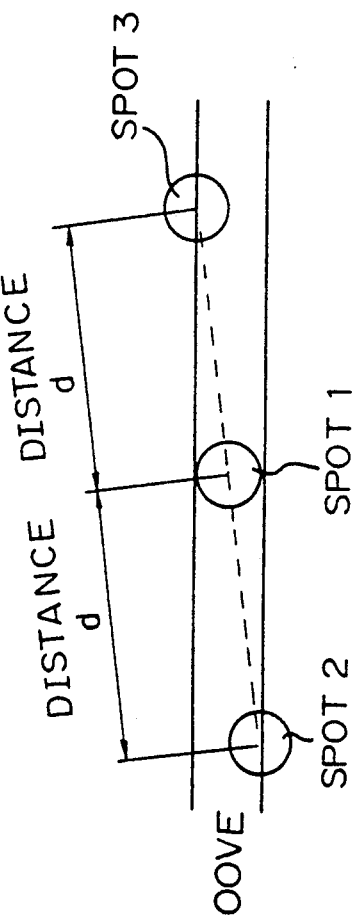
FIG. 2 illustrates a prior art three-beam tracking error detection method.
Figure 2B:
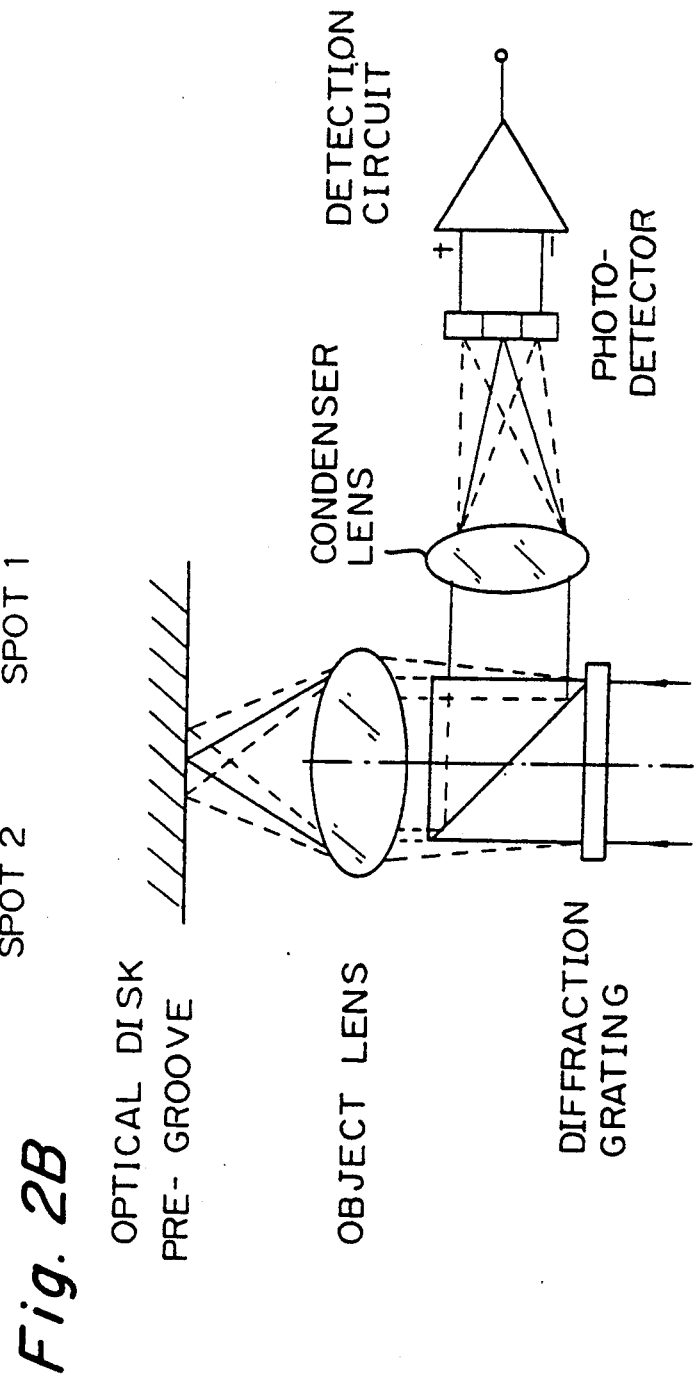

FIG. 2 illustrates a fundamental form and the operation of the three spots in the three-beam method.

Figure 3:
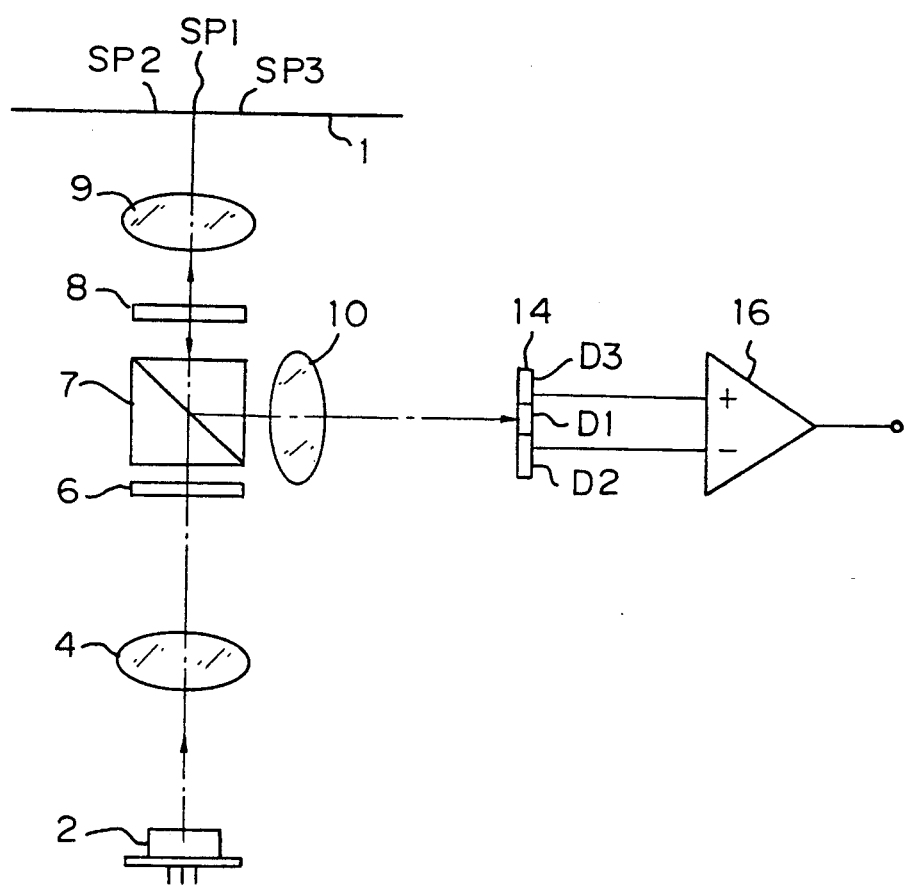
FIG. 3 shows an apparatus for effecting a prior art three-beam tracking error detection method.
Figure 4:
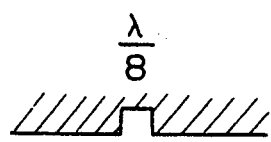
FIG. 4 illustrates a shift of spots for a pre-groove of the recording medium.

FIGS. 2 and 3 show a constitution of the device for effecting the three-beam method. In FIG. 3, reference numeral 1 denotes an optical disk, 2 a laser diode LD for generating a laser beam, 4 a collimeter lens for obtaining a parallel luminous flux, 6 a plane diffraction grating, 7 a beam splitter, 8 a λ/4 retardation plate, 9 an objective lens, 10 a condenser lens, 14 a three-section photodetector, and 16 an operational amplifier for a detection circuit. A device incorporating reference numerals 2 to 14 (that is, from a laser diode to a photodetector) is referred to as a photo-detector portion. A laser beam from the laser diode 2 is made into a parallel light beam by the collimator lens 4 and via a diffraction grating 6, a polarized beam splitter (PBS) 7, a λ/4 wavelength plate 8 for effecting a transformation of a circularly polarized light, and an objective lens 9, and the laser beam is then irradiated onto SP1 of a disk medium plate 1 as a first spot. The laser beam passing through the diffraction grating 6 is diffracted and then irradiated onto SP2 and SP3 as a second spot and a third spot on both sides of SP1 on the medium plane 1. In this case, if a shift of the spot to a pre-groove of the medium occurs, problems result as shown in FIG. 4. Light reflected from the SP1, SP2 and SP3 reverts and is then transferred perpendicularly to the reverted light on the reflection plane in the beam splitter 7, to arrive at the positions of D1, D2 and D3 in the photodetector 14 through a condenser lens 10.

Figure 5:
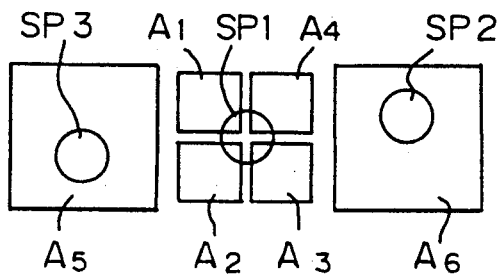
FIG. 5 shows a prior art photodetector.

FIG. 5 shows a side elevation of the photodetector 14 where light falls from the upper sides thereon used through a condenser lens 10. In FIG. 5, D1 is used to detect a reflected light from a first spot SP1, D2 that from a second spot SP2, and D3 that from a third spot SP3. D1 denotes a detection portion quartered from A1 to A4, which detects information signals and detects a focusing error using an astigmatism method (In FIG. 3, no optical element is shown for generating astigmatism). A5 and A6 are a second and a third spot detection portions for detecting a tracking error. That is to say, when there is no difference between the detector outputs, it is determined that the first spot between them is present at the center of a track groove or pre-groove, and when there is a difference between the detector outputs, the direction of a shift of a track in relation to the spot is detected, according to whether the difference signal is positive or negative.

Figure 6:
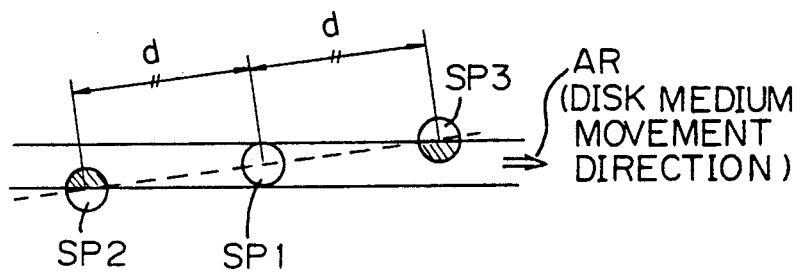
FIGS. 6 and 7 illustrate tracking errors according to a direction of movement of the recording medium.
Figure 7:
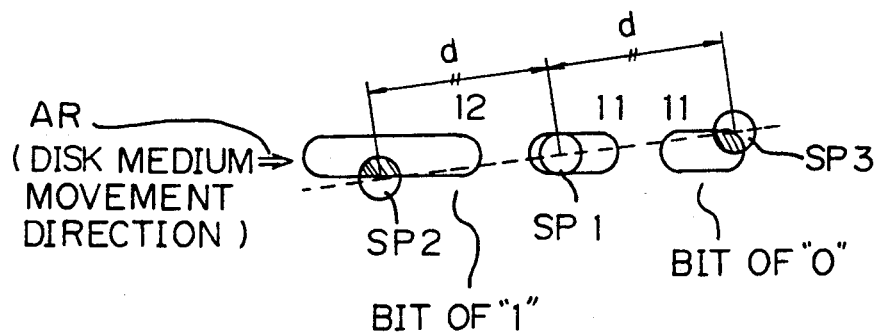

FIGS. 6 and 7 are drawings for explaining a tracking error. FIG. 6 shows a diagram of a Write-Once type or a Phase-Change/Magnetooptics type disk utilizing an optical disk with pre-grooves, and FIG. 7 is a diagram of a disk in which a series of pits are written and which has no pre-groove. In FIG. 6, a main beam SP1 denotes a position where a first spot is irradiated, auxiliary beams SP2 and SP3 separate positions where a second and a third spot are irradiated, AR a transfer direction of an optical disk medium, and PG pre-groove data recorded on a track of the medium 1. An interval of the position where each spot is irradiated is equal to d. The first spot is desired from 0-order transmitted light and the second and third spot on plus or minus primary-order diffracted light. The more than ±2-order- diffracted light which is generated when a diffraction grating is employed, is weaker than the transmitted light or the ±1-order diffracted light and is slightly separated, so the detector 14 is so constituted that it cannot detect anything. In FIGS. 6 and 7, SP1 is a main spot for writing, reading and erasing information, and when the position of SP2 and SP3 changes, the inputs to the detection portions of A5 and A6 vary, as shown in FIG. 5. Therefore, the outputs of A5 and A6 are calculated and the position of the objective lens 9 is regulated so that each output of the detection portion has the same value.

Regarding the information, FIG. 6 shows a case in which a series of pits corresponding to the information "0" and "1" are formed. In FIG. 7, reference numeral 11 denotes a pit of, for example, data "0" (that is, a short pit), 12 a pit of data "1" (that is, a long pit), AR a transfer direction of a medium, and d an interval of positions for irradiation between each spot SP1, SP2, and SP3. SP2 and SP3 are arranged on opposite edges of pit 11 and pit 12, respectively. Therefore, the operation of light reflected from the medium being detected by the detector 14 to detect a tracking error, is the same as in FIG. 6.

In the case where the disk medium is of a magnetooptics type, when the configuration of an incident spot in a detector varies just a little due to a minute slant of the disk medium, it does not at all interfere with the detection operation of detecting, as long as the configuration is present in the detection sphere, especially of A5 and A6 in FIG. 5. Thus, the detection operation of the device is not affect.

The tracking error detection method by the three-beam method shown in FIGS. 2 to 7 however, necessitates that reflectances from the second and third spots for detecting a tracking error are equal on the groove of the medium. For this reason, for example, in a phase-change type optical disk, when information is being written by the first spot the reflectance differs from the completely written sphere and in the not-yet-written sphere and the tracking error cannot be correctly detected. This also applies to the write-once type of disk. Moreover, there is another problem in the tracking error detection by the three-beam method in that a focusing error can occur.

An apparatus for carrying out a tracking error detection method according to an embodiment of the present invention is shown in FIG. 8.

In FIG. 8, reference numeral 1 denotes an optical disk medium, 2 a semiconductor laser, 7 a beam splitter, 9 an objective lens, 10 a condenser lens, 13 a diffraction element formed by two diffraction gratings, 14 a photodetector, 15 a track groove on an optical disk medium and 16 a calculation circuit.

the device of FIG. 8 is constituted as follows. The device includes means for focusing and irradiating the first spot SP1, a disposal means, photodetectors and a calculation circuit.

The means for focusing and irradiating the first spot SP1 comprises a semiconductor laser 2, a diffraction element 13, a beam splitter 7 and an objective lens 9, and focuses and irradiates the first spot SP1 for recording, reproducing and erasing information on an optical disk medium 1.

A diffraction element 13 extends over each stage for separating a groove portion 15 from a non-groove portion. The diffraction element 13 irradiates a first, a second and a third light spots onto an area around the groove track on the recording medium. The first light spot is irradiated onto a groove track as a focused light irradiation for recording, reproducing or erasing information on the groove track of the recording medium. The second and third light spots are irradiated onto an area around the groove track on the recording medium as focused light beams and the second and third light spots are irradiated onto an area around the groove track on one side of the first light spot in such a manner that each of the second and third light spots covers both an inside and outside of the groove track.

The photodetector unit 14 is comprised of three photodetectors D1, D4 and D5 and receives reflected light rays from separate spots SP1, SP4 and SP5. A calculation circuit 16 computes outputs of the photo-detector unit 14 to calculate a tracking error.

The structure of the diffraction element 13 utilized for the apparatus of FIG. 8 is shown in FIG. 9. In FIG. 9, two diffraction gratings 18, 19 have different directions of diffraction and 20 denotes a light axis. the two diffraction gratings 18, 19 having different diffraction directions are disposed so as to irradiate the second and third spots.

Figure 10:
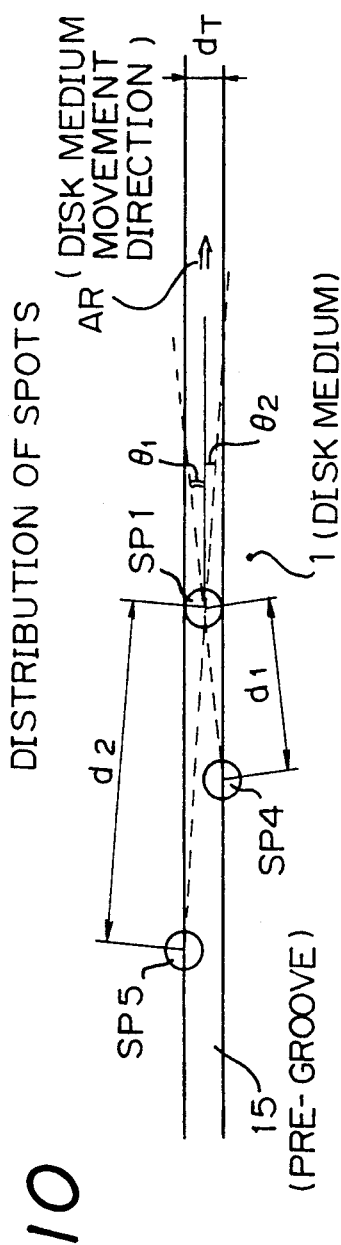
FIG. 10 illustrates the arrangement of spots in the apparatus of FIG. 8.

FIG. 10 is a diagram showing the arrangement of the spots in the structure of FIG. 8. In FIG. 10, reference numeral 1 denotes an optical disk medium, 15 a track groove or pre-groove of the optical disk medium, and SP4 and SP5 a second spot and a third spot. A laser beam from a semiconductor laser 2 in FIG. 8 is irradiated onto a track groove 15 of the optical disk medium 1 as a first spot SP1. A second spot SP4 and a third spot SP5 which are generated by the diffraction gratings 18, 19 shown in FIG. 9 are disposed to extend over the stage difference between an upper stage and a lower stage of the groove 15. Due to this disposal, when a track position shifts due to eccentricity in the course of rotation of the optical disk medium 1, a malfunction is detected in the photodetector 14 in FIG. 8 which detects the reflected light from a second spot SP4 or a third spot SP5. Then, the output of the photodetector 14 is calculated in the calculation circuit 16, and the position of the spot irradiation means is finely regulated in the propose direction until the difference output is reduced to zero. From this, the first spot SP1 is stabilized at the position where it enters into a track groove 15. Even if the medium 1 is situated in a direction shown as a transfer direction AR (that is, when other spots precede to the first spot) or vice versa, the state remains unchanged. That is, it originates from the fact that even when information is being written by the first spot, the write state and the non-write state are the same. In order to arrange both spots on one side of the first spot as in the second and third spots, two diffraction gratings having different diffraction directions (that is, the direction of grating fringe) will serve this purpose.

In FIG. 10, it is desirable that both the distance $d_1$ from the first spot SP1 to the second spot SP4 and the distance $d_2$ from the first spot SP1 to the third spot SP5 should be made as small as possible up to an extend at which an image of spot can be separated on the photodetector, and the first spot SP1 can be stabilized in an On-track state.

Figure 12:
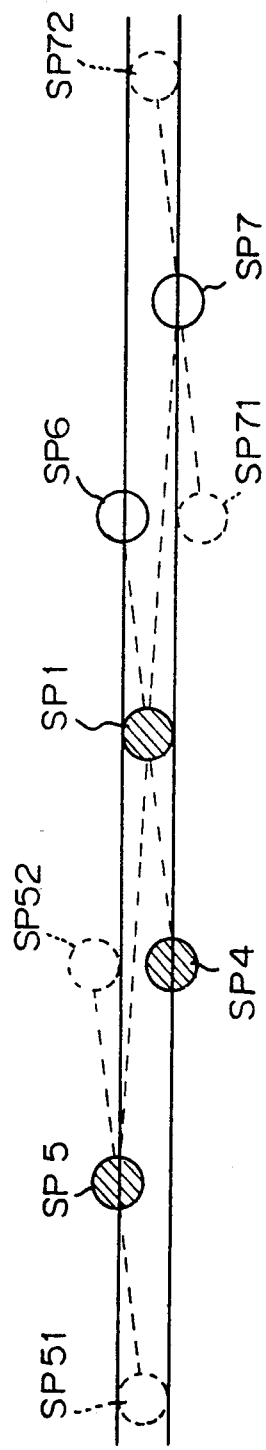
FIG. 12 illustrates the distribution of spots on the recording medium.

FIG. 12 shows a configuration of each spot. The function of the spots SP1, SP4, and SP5 in FIG. 12 can be explained in the same way as in FIG. 10. That is, a tracking error is detected by spots SP4 and SP5. The detection is effected by the photodetector 30 and in this case, the position of the spot irradiation means is finely controlled so that an error can be cancelled.

Figure 11:
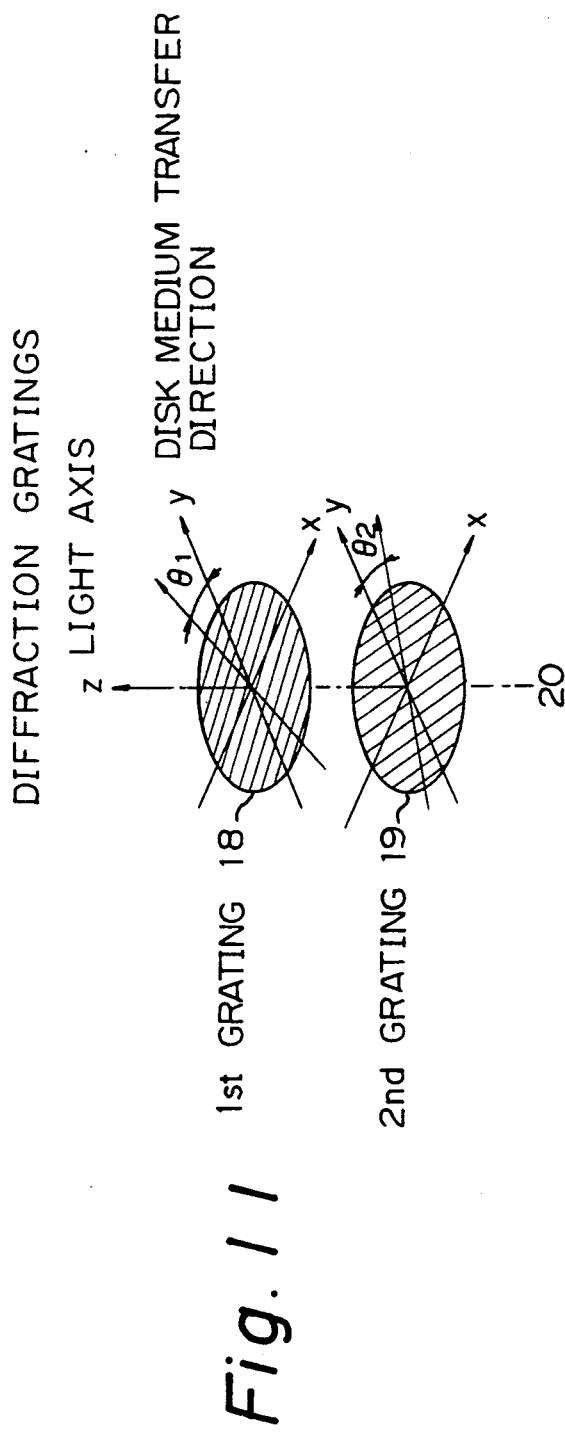
FIG. 11 shows an arrangement of two diffraction gratings.

Next, referring to FIGS. 10 to 12, the operation of the diffraction gratings will be described in detail. FIG. 11 is a diagram showing the disposal of two diffraction gratings 18 and 19. The two gratings have different grating pitches, the directions of the grating stripes are shifted in relation to each other and the gratings are set in a luminous flux of a laser beam. If the angles $\theta_1$ and $\theta_2$ which indicate a direction vertical to the grating stripes and a medium transfer direction AR (a direction of the track groove) form there between are illustrated responsive to FIG. 10, the angles are shown with the width of a track groove $d_T$ and the intervals of spots $d_1$, $d_2$ by the following relational expression.

$$\theta_1 = \sin^{-1}(d_T/2d_1)$$

$$\theta_2 = \sin^{-1}(d_T/2d_2)$$

If the pitches of the grating stripes are 47 μm and 94 μm, respectively, the wavelength is 830 nm, and the focal distance of an objective lens f is 3.4 mm, a reflected angle of ±1-order diffracted light is multi-plated by the focal distance f to obtain the spot interval $d_1$ and $d_2$ as follows.

$$\text{viz., } d_1 \doteq 30 \text{ μm}$$

$$d_2 \doteq 60 \text{ μm}$$

In fact, based on the light diffracted by two diffraction gratings, a number of spots are distributed on the disk medium. FIG. 12 is a diagram showing spots distributed on the medium. As shown in FIG. 11, when the laser beam enters in a grating 18 after passing through a grating 19, gratings by the 0-order passage of the laser beam through both gratings, the first spot SP1 is produced. The spots SP1, SP5 and SP7 caused by the diffraction grating 19 and these spots develop the ±1-order light produced by the diffraction grating 18 to generate a number of spots SP4, SP6, SP51, SP52, SP71, and SP72. The spots which are used for detecting a tracking error are a combination of SP4 and SP5 or a combination of SP6 and SP7.

Figure 13:
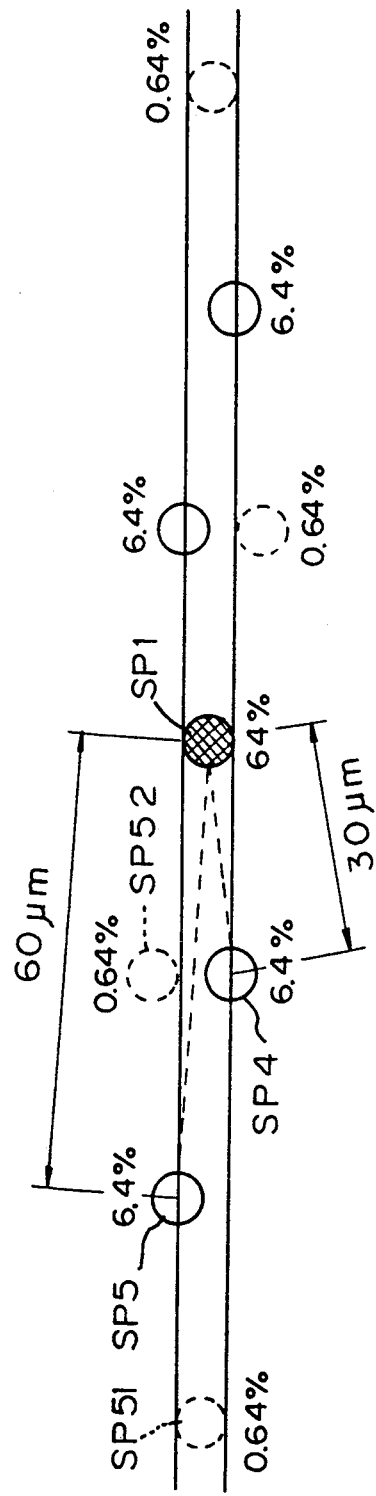
FIG. 13 illustrates a light intensity ratio between spots.

Both diffraction gratings 18 and 19 are made to be a value such that the 0-order transmittance of the vertical incidental ray may be some 80% and the ±1-order diffraction efficiency is some 8%. Accordingly, the ratio of the intensity of nine spot light rays or the ratio of the quantity of light attains the values as shown in FIG. 13. If the ratio of the incident light to a diffraction grating is 100%, for example, when the first spot SP1 is produced by two diffraction gratings, it is equal to $80\% \times 80\% = 64\%$.

There are four spot components that are diffracted by either of the diffraction gratings, with one diffracting grating diffracting and the other transmitting, with an efficiency equal to $$80\% \times 8\% = 6.4\%$$

There are also four components that are diffracted by each of the two diffraction gratings with an efficiency equal to $$8\% \times 8\% = 0.64 \%$$

Since the components of a higher order of diffracted light more than ±2-order becomes much lower, the value can be neglected.

The ratio of the intensity of light in the first spot SP1 versus the spots SP4 and SP5 for detecting a tracking error is 10 to 1, and the latter does not affect the recording operation of the former.

Figure 24:
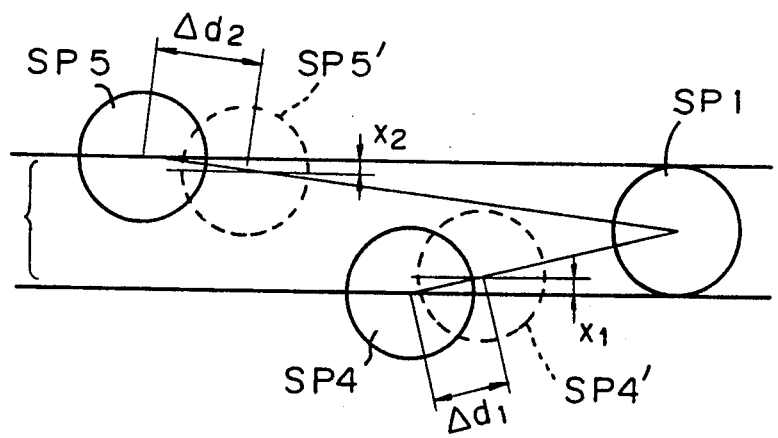
FIG. 24 is a diagram showing variations in spot placement.

FIG. 24 is a diagram showing the variation of a spot position when the wavelength of the laser beam changes due to a change of atmosphere temperature. A semiconductor laser is used in order to generate a laser beam. It is known that, if a single mode of a laser beam is being generated, when atmospheric temperature and driving current change, the wavelength of the laser beam to be generated changes correspondingly. Since a diffracted light due to a diffraction grating is employed for the purpose of the spot for detecting a tracking error, the position for irradiating a spot changes corresponding to the change of wavelength.

In FIG. 24, a circle indicated by a solid line shows the position of a normal wavelength of a first spot SP1 to a third spot SP5 and circles SP4' and SP5' indicated by a broken line show each spot position when the wavelength becomes shorter. When an original wavelength changes, for example, the variation is $\Delta\lambda$ ($<0$) and a respective shift value of the spots is $\Delta d_1$ and $\Delta d_2$. The detection of a tracking error corresponds to the calculation of the difference signal between the outputs of the photodetectors responsive to the spots SP4 and SP5, so it is necessary to take into account the relationship between $\Delta X_1$ and $\Delta X_2$ when the wavelength changes. In this case, it is necessary to prove the relationship $$\Delta X1_1 = \Delta X_2$$

Calculate the relationship or FIG. 12.

$$\frac{\Delta x_1}{d_T/2} = \frac{\Delta d_1}{d_1} \tag{1}$$

$$\frac{\Delta x_2}{d_T/2} = \frac{\Delta d_2}{d_2} \tag{2}$$

Suppose that a diffraction angle by means of a diffraction grating is $\theta$, the spot intervals $d_1$ and $d_2$ are proportional to $\tan \theta$. As $\theta$ is sufficiently small, it may be considered that $d_1$ or $d_2 \infty \theta$.

On the other hand, suppose that a spatial frequency (a reciprocal of a pitch) of the diffraction grating is f, it then holds that the relationship for a 1-order diffraction light is $$\sin \theta \doteq f \cdot \lambda \tag{3}$$

Also, since $\theta$ is small, suppose that $$\sin\theta \doteq \theta,$$

we then obtain $$\theta \propto \lambda.$$

That is, since $d_1$ or $d_2 \propto \lambda$, the following relationship holds.

$$\frac{\Delta d_1}{d_1} \propto \frac{\Delta\lambda}{\lambda} \quad (4)$$

$$\frac{\Delta d_2}{d_2} \propto \frac{\Delta\lambda}{\lambda} \quad (5)$$

From the above expression, even if there is a change of wavelength, $\Delta x_1 = \Delta x_2$ is derived. This is true with $\Delta\lambda > 0$. Thus, a desirable result is obtained.

Figure 14:
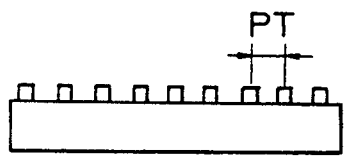
FIGS. 14 and 15 are both cross-sectional views of a rugged surface type and a volumetric type of diffraction gratings.
Figure 15:
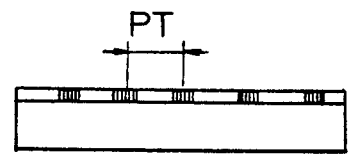
Figure 16:
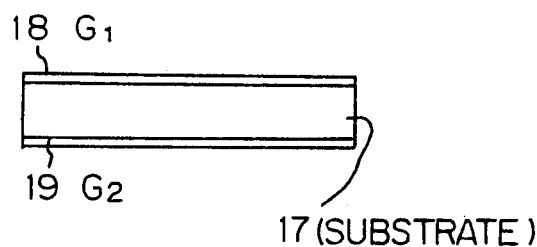
FIGS. 16 to 18 show an integrated type, a multiple layer type, and a multi-recording type of diffraction gratings.
Figure 17:
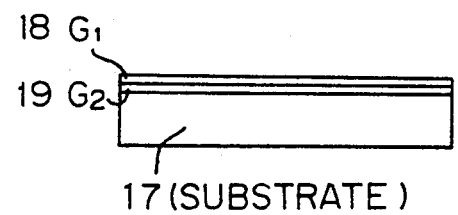
Figure 18:
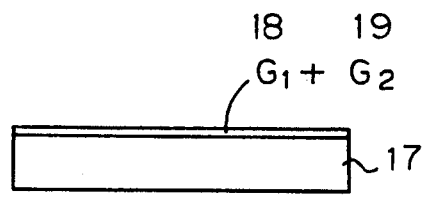

A concrete structure will be described in which two diffraction gratings are disposed. FIGS. 14 and 15 are cross-sectional views showing different kinds of diffraction gratings. In the figures, a plane diffraction grating is shown in which the stripes of the diffraction grating are straight and the pitches PT are equal to each other over the whole grating. FIG. 14 shows sectional diagram of a diffraction grating in which a striped pattern is applied to a rugged surface type, and FIG. 15 is a sectional diagram showing a volumetric type or a refractive index-change type. FIGS. 16 to 18 show two types of diffraction gratings.

FIG. 16 is a diffraction grating in which two types of grating 18, 19 are attached to both sides of a substrate 17. This is used for both a rugged surface type and a volumetric type grating. FIG. 17 shows a multi-layer structure in which diffraction gratings are laminated on one side of a substrate 17 which is then used as a volumetric type. FIG. 18 shows a multi-recording diffraction grating which has the functions of two kinds of diffraction gratings on one film of substrate.

A method of making a multi-recording diffraction grating is illustrated in FIGS. 19 and 20. In FIG. 19, three coherent plane waves are interfered with to form interference fringes or effect an electron beam exposure method, for the purpose of providing a part of a vertical incident plane wave to the diffraction grating with a special function of diffracting in two different directions. In FIG. 20, the interference exposure of two coherent plane waves is carried out twice to form interference fringes or effect an electron beam exposure method.

Figure 21:
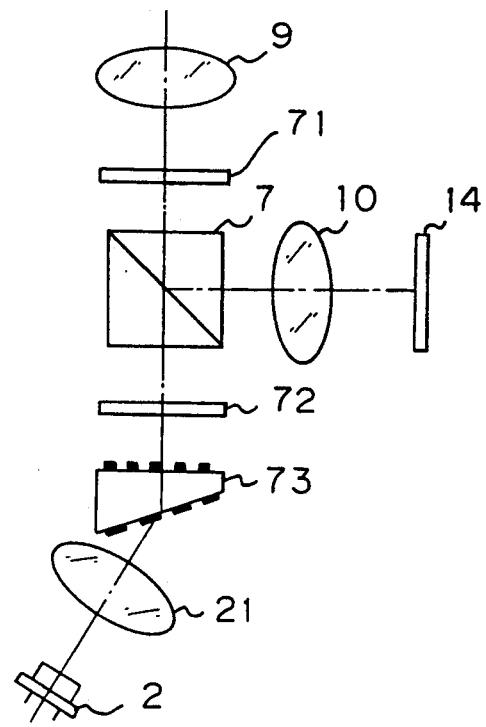
FIG. 21 is a diagram showing another embodiment of an arrangement of diffraction grating.
Figure 22:
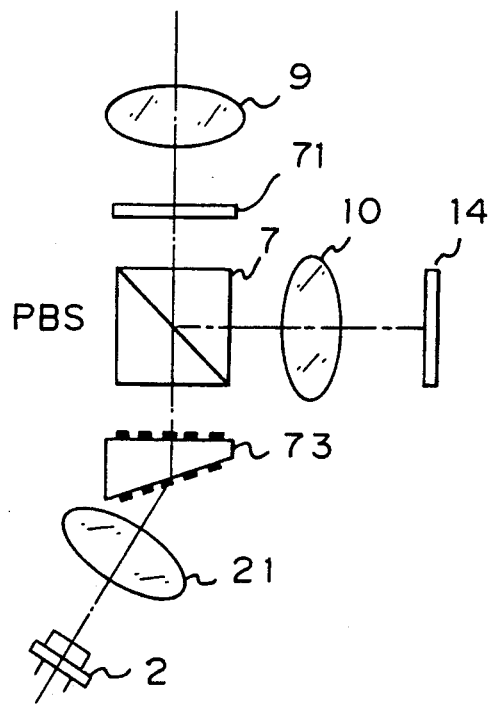
FIG. 22 is a diagram showing two sheets of diffraction gratings integrated with a prism.

FIGS. 21 and 22 show another embodiment of a disposal of a diffraction grating.

In FIG. 22, two diffraction gratings are disposed at the medium side 71 and at the laser source side of a beam shaping prism 21 which is used as a prism 73 as shown in FIG. 21, and the rugged surface prism in FIG. 14 is utilized to transform an elliptical beam into a circular one. For example, resist is employed to form the diffraction grating by means of an electron beam direct picturing method. Since the diffraction grating is arranged on both sides of the beam shaping prism in a path of a laser beam, a dimensional increase of the optical system due to the integration of the diffraction grating can be neglected.

Figure 23:
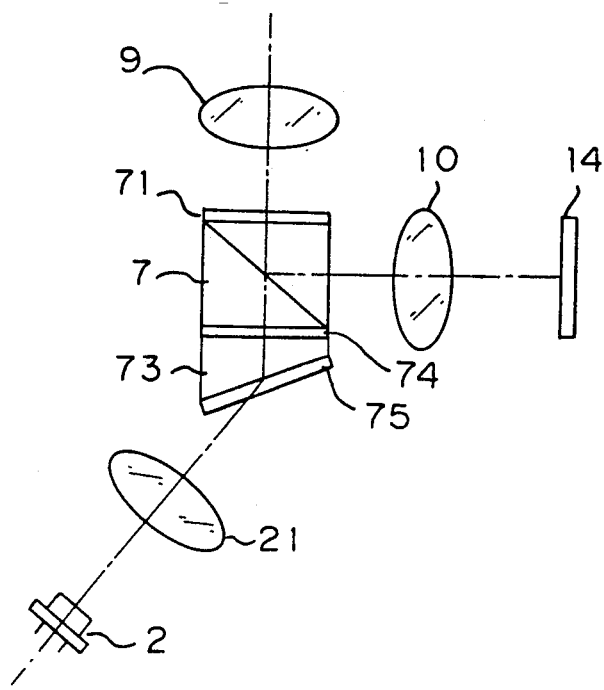
FIG. 23 is a diagram showing a diffraction grating integrated with a beam splitter.

FIG. 23 is a diagram showing another embodiment of the disposal of the diffraction grating, which illustrates the incorporation of a beam shaping prism 73 and a beam splitter 7. In this embodiment, the prism 73 and the beam splitter 7 are combined to incorporate the diffraction gratings 74 and 75 forming a volumetric type grating. The volumetric diffraction grating is formed by, for example, polyvinyl carbazol (PVCz), which is a material of good transparency and of small transmission loss, thus enabling a more miniaturized structure of an optical head.

A photodetector will be described with reference to FIG. 25, which is a diagram showing a positional relationship of a photodetector 14 shown in FIG. 8.

Figure 25:
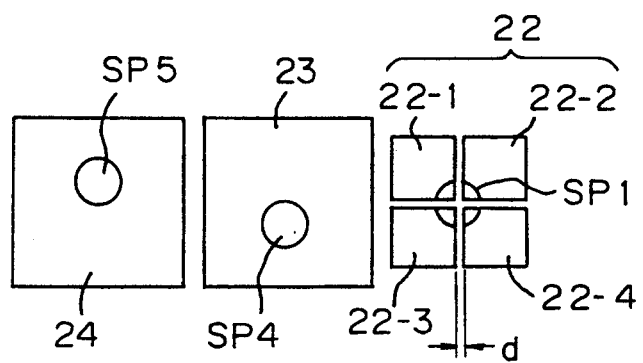
FIG. 25 is a diagram showing the relative placement of a photodetector.

In FIG. 25, reference numeral 22 denotes a photodetector for a first spot. A solid circle in each photodetector illustrates an irradiation from a corresponding spot. The photodetector 22 for the first spot is divided into four parts 22-1 to 22-4, each part is a perfect square having 100 to 300 μm sides and is arranged at an interval of some 10 μm. The tracking error detector 23 and 24 lie on one side of the first spot photodetector 22, that is, on the left side of FIG. 25, each side being 200 to 600 μm and forming a perfect square. The photodetector 22 is formed by a six-divided PIN photodiode. Another embodiment of the photodetector is shown in FIG. 27, which is shown in FIG. 26.

Figure 26:
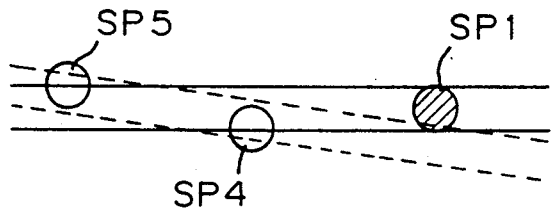
FIG. 26 is a diagram showing an incomplete state of a tracking error detection method.

FIG. 26 is a diagram explaining an extreme case where a tracking error in the present invention is detected imperfectly. In FIG. 26, spots SP1, SP4 and SP5 are the same as shown in FIG. 8 and the position of a spot shown by a solid line is normal, but the relational position with a groove as shown by a broken line may change in some cases. For this reason, the output difference signals from the second and third spots are zero, but the first spot cannot irradiate at a normal position. Therefore, another method is investigated which utilizes the fourth spot SP6 as shown in FIG. 12.

Figure 27:
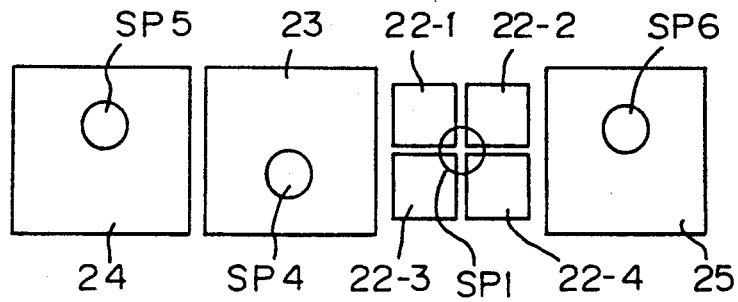
FIG. 27 is a diagram showing the relative placement of another embodiment of a photodetector.

In response to a spot SP6 which relates to the ±one-order diffracted light and is essentially unnecessary to the second spot SP4, another photodetector is added on the reverse side with the photodetector for the second spot as shown in FIG. 27. In the first setup of the status, three photodetector 22, 23, 25 are utilized and supposing that the optical disk medium is not yet recorded on or has been already recorded on, as long as the second and the fourth spots are in the same state, the diffraction grating are adjusted, that is, it is necessary to adjust such that the output of the photo-detector 23 is the same as that of the photodetector 25 and the output of the photodetector 23 will be the same as that of the photodetector 24.

The device for effecting a detection method of a tracking error and a focusing error as still another embodiment in accordance with the present invention will be described with reference to FIGS. 28 to 40. In the device of FIG. 28, a tracking error is detected by spots SP4 and SP5 and a focusing error is detected by spots SP6 and SP7. On the contrary, spots SP4 and SP5 may be utilized for the detection of a focusing error and spots SP6 and SP7 for the detection of a tracking error.

FIG. 28, reference numeral 1 denotes an optical disk, 2 a semiconductor laser, 7 a beam splitter, 9 an objective lens, 10 a condenser lens, 13 a diffraction element formed by two sheets of diffraction gratings, 15 a track groove, 30 a photodetector and 31 a calculation circuit.

The device of FIG. 28 has the following constituent. That is, the device includes:

means (1, 13, 7, 9) for focusing and irradiating a first spot SP1 for the purpose of recording, reproducing and erasing information on an optical disk medium;

a disposal means 13 for irradiating a second spot SP4 and a third spot SP5 as a first group and a fourth spot SP6 and a fifth spot SP7 as a second group, onto a groove track on the recording medium as focused light beams simultaneously with said irradiation of the first spot SP1, said second to fifth spots being irradiated onto the groove track in such a manner that the spot belonging to either group is irradiated on the same side of the first light spot SP1, that the groove portion and the non-groove portion are discriminated, that the focused spot and the non-focused spot are discriminated, and that each of the second to fifth spots covers both an inside and outside of the groove track;

five photodetectors 30 for receiving reflected light beams from each of spots SP1 and SP4 to SP7; and a calculation circuit 31 for calculating each output of the photodetector 30 and computing a tracking error and a focusing error.

The diffraction grating element 13 as a spot disposal means as shown in FIG. 9, is disposed to include two different sheets of diffraction gratings 18 and 19 to generate a light spot.

The constitution and operation of the device in FIG. 28 will be described in reference to FIGS. 29 to 40.

Figure 29A:
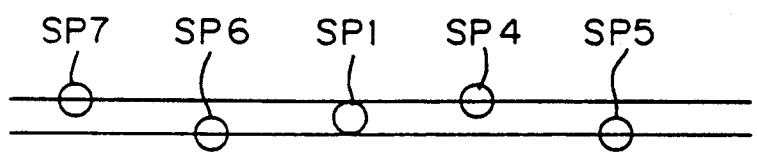
FIG. 29 is a diagram showing a photodetector of the device in FIG. 28.
Figure 29B:
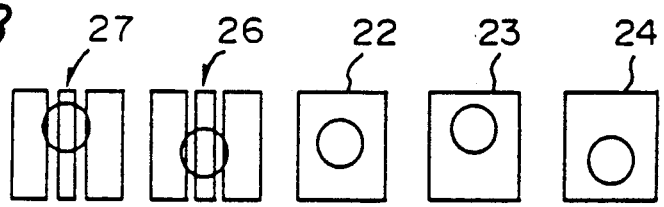
Figure 29C:
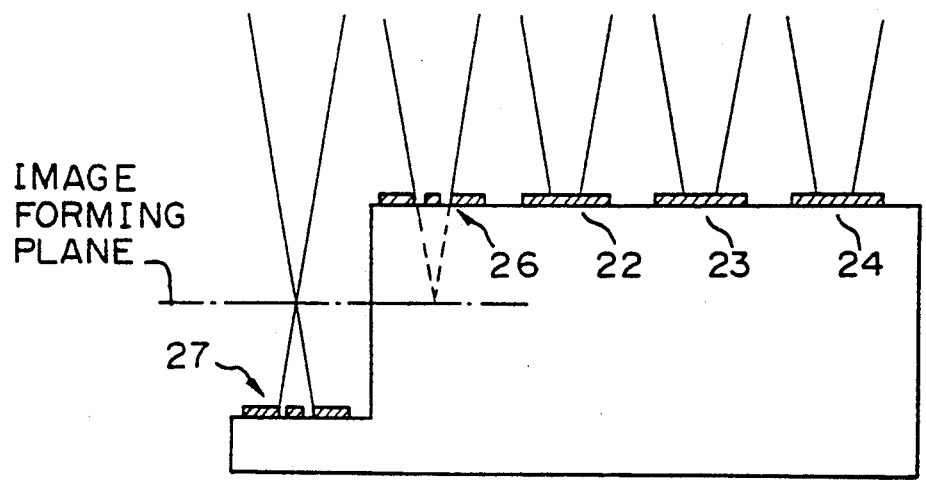

FIG. 29 shows an arrangement of a photodetector 30 and spots. The top portion of FIG. 29 shows the disposal of spots on the track groove of an optical disk, the middle portion of FIG. 29 a top view diagram of the disposal of the photodetector and the lower portion of FIG. 29 a side view diagram of the photo-detector.

In the top portion of FIG. 29, SP1 denotes a first spot for recording and reproducing information, SP4 and SP5 denote a second spot and a third spot for detecting a tracking error which spots are obtained by a (+) 1-order light passing through a respective diffraction grating. SP6 and SP7 denote a fourth spot and a fifth spot for detecting a focusing error which spots are also obtained by a (−) 1-order light. In the middle portion of FIG. 29, reference numeral 23 and 24 denote photodetectors for detecting a tracking error, the position of spots shifting in response to both sides of the track groove, 26 and 27 are photodetectors for detecting a focusing error each being divided into three parts in a direction of the track groove, and 22 is a photodetector for a first spot which is not divided. In the lower portion of FIG. 29, 26 and 27 make the position of spots differ upward and downward in the direction of light irradiation. That is, 26 lies in the same plane as the other photodetectors 22, 23 and 24, and 27 is disposed at the position in which the same dimension of beam radius as the photodetector 26 is obtained, after a focusing beam once forms an image.

Figure 30:
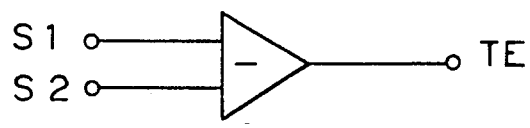
FIGS. 30 and 31 are schematic block diagrams showing an operative circuit of the device in FIG. 28.
Figure 31:
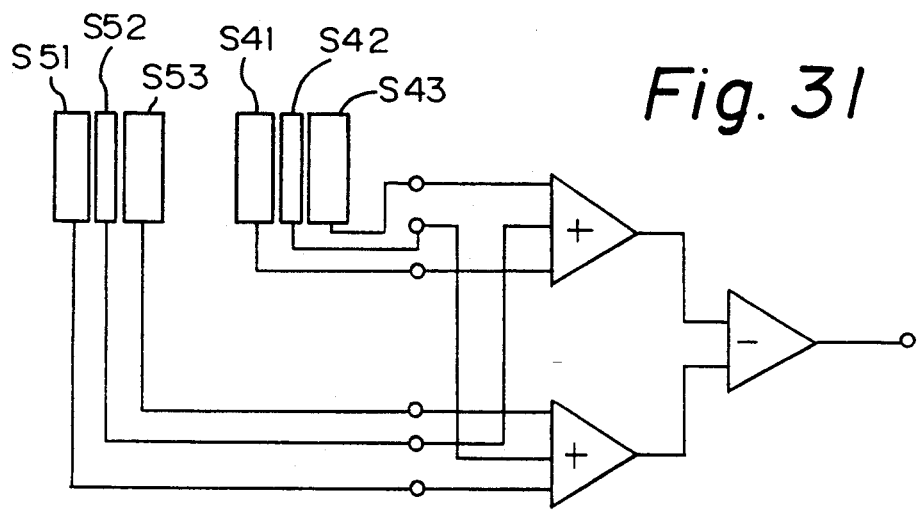

FIGS. 30 and 31 are diagrams showing a concrete constitution of a calculating circuit 31 shown in the device of FIG. 28. FIG. 30 is a subtraction circuit for obtaining the difference signal for detecting a tracking error TE, and its operational expression is indicated as follows.

$$TE = S2 - S3,$$

where S2 denotes the output of the photodetector 22 for a second spot and S3 the output of the photodetector 23 for a third spot.

FIG. 31 is a detection circuit for detecting a focusing error FE, S41 to S43 denote the output of the photodetector 25 for a fourth spot and S51 to S53 the output of the photodetector 26 for a fifth spot. A sum signal of S41, S52 and S43 and a sum signal of S51, S42 and S53 are obtained with regard to the outputs of each divided photodetector, then a remote and near state of focusing on the surface of the optical disk from the above two difference signals are detected. An operational expression of the focusing error FE is indicated as follows.

$$FE = (S41 + S52 + S43) - (S51 + S42 + S53)$$

Figure 32:
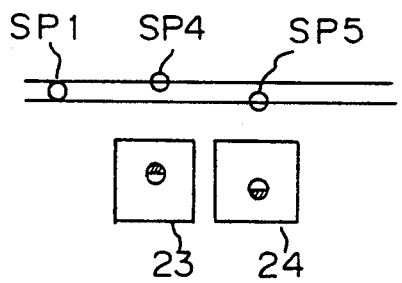
FIGS. 32 to 34 are diagrams showing each signal display method when detecting a tracking error.
Figure 33:
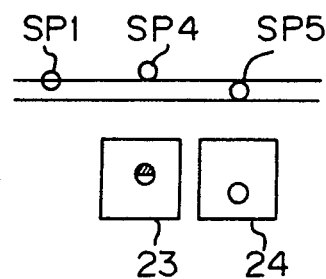
Figure 34:
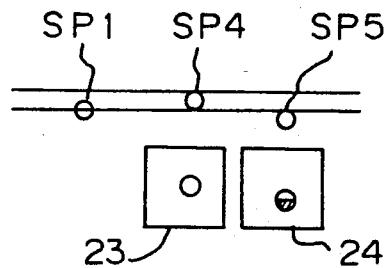

FIGS. 32 to 34 show the signals of detectors 23 and 24 when the tracking error is detected. In FIG. 32, as spots SP1, SP4 and SP5 are found normally on the track groove, the amount of each dark portion of the spot in the detectors 23 and 24 is the same. In FIGS. 33 and 34, as each spot is not found on the track groove, each dark part is different, and the direction of the tracking error can be discriminated by the calculating circuit.

FIGS. 35 to 37 are diagrams showing the signals of detectors 26 and 27 when a focusing error is detected. FIG. 35 shows that S41 and S51, S42 and S52, and S43 and S53 are equal to each other and the focal point fits perfectly. When the optical disk comes close to a light source, as shown in FIG. 36, since the focal point of the signal light is prolonged, the beam radius entering the detector after image-formation is small and the beam radius before image-formation is large. For this reason, if a calculation is effected by the calculation circuit, it is seen that the result is not zero, but the occurrence of a focusing error is detected. FIG. 37 shows a case where the optical disk is apart from the light source and is in a reverse state from the case of FIG. 36.

FIG. 38 and 38 are diagrams showing a change of luminous energy of the photodetector when a flat-disk vibrato occurs. FIG. 38 shows a case where the flat-disk vibrato does not occur, and is the same as in FIG. 35. FIG. 39 shows a case where the position of spots entering each detector changes, as the flat-disk vibrato occurs. In this case, since the luminous energy of S41 and S51, S42 and S52, and S43 and S53 are equal to each other, when the calculation is carried out by the calculation circuit shown in FIG. 31, the result is zero due to the cancelation of the difference, and the focusing error is not recognized.

Next a case where the birefringence of a glass layer for protecting the optical disk should be taken into account will be described. In FIG. 40, it is shown that a partial birefringence is found in a part of a substrate of the optical disk and the spot on the photodetector of FIG. 22 where a port of the signal light is darkened, (at the part of a dark point) is illustrated. In this case, the dark positions of the signal light which after image-formation and before image-formation, enters into the photodetector, are symmetrical. Therefore, due to the calculation by the circuit shown in FIG. 31 the dark points are cancelled, and the focusing error which originated from the birefringence does not occur.

We claim:

1. An apparatus for detecting a tracking error during a process for tracing a groove track on a recording medium comprising:

a light source for producing light used to generate first, second and third light spots to be irradiated onto the recording medium;

a diffraction grating for producing first, second and third light beams, said diffraction grating comprising:
  a pair of planar diffraction gratings each having a grating stripe and having different grating pitches, different diffraction directions, and angles $\Theta_1$ and $\Theta_2$ which indicate a direction vertical to each of the grating stripes, respectively, and a recording medium transfer direction, are given as $\Theta_1 = \sin^{-1}(d_T/2d_1)$ $\Theta_2 = \sin^{-1}(d_T/2d_2)$ where $d_T$ is a width of the groove track and $d_1$ and $d_2$ are each a distance between the first and second light spots, and the first and third light spots, respectively, and
  a transparent substrate incorporated with said planar diffraction gratings, where directions of grating of said planar diffraction gratings are different from each other by a predetermined angle;
irradiation means for generating based on the first, second and third light beams said first, second, and third light spots and for irradiating said light spots onto an area around the groove track on the recording medium, said first light spot being irradiated as a focused light emission onto the groove track for recording, reproducing, or erasing information on the groove track of the recording medium, said second and third light spots being irradiated onto an area around the groove track on the recording medium as focused light beams, said second and third light spots being irradiated onto an area around the groove track on one side of said first light spot in such a manner that each of said second and third light spots covers both an inside and outside of the groove track;

a plurality of photodetectors for detecting reflected light beams of said first, second, and third light spots reflected from the recording medium; and
calculation means for determining a tracking error based on the detecting result of said photodetectors.

2. An apparatus for detecting a tracking error according to claim 1, further comprising:
  a prism; and
  a light beam splitter; and wherein
    said diffraction grating and said prism are arranged between said light source and said light beam splitter.

3. An apparatus for detecting a tracking error according to claim 1, wherein said photodetectors comprise a serially arranged first photodetector for receiving reflection light reflected from said first light spot, and second and third photodetectors for receiving reflection lights reflected from said second and third light spots, respectively.

4. An apparatus for detecting a tracking error according to claim 3, wherein said photodetectors further include a fourth photodetector arranged symmetrical to the second or third photodetector with regard to the first photodetector and wherein
  the apparatus further includes means for adjusting a the diffraction grating by outputs of said first to fourth photodetectors.

5. An apparatus for detecting a tracking error according to claim 1, wherein said diffraction grating generates either said first light beam or said second light beam having diffracted light of ±1 order.

6. An apparatus as recited in claim 1, wherein one of said pair of planar diffraction gratings is formed on one side of said transparent substrate, and wherein the other of said pair of planar diffraction gratings is formed on the other side of said transparent substrate.

7. An apparatus as recited in claim 1, wherein said pair of planar diffractions grating are laminated together and formed on one plane of said transparent substrate.

* * * * *

UNITED STATES PATENT AND TRADEMARK OFFICE
CERTIFICATE OF CORRECTION

PATENT NO. : 5,224,082

DATED : June 29, 1993

INVENTOR(S) : Kurokawa et al.

It is certified that error appears in the above-indentified patent and that said Letters Patent is hereby corrected as shown below:

Col. 6, line 4, "the" (first occurrence) should be "The".

Col. 13, line 35, "the" should be --said--;
line 40, "said" should be --the--.

Col. 14, line 3, "the" should be --said--.

Signed and Sealed this

Nineteenth Day of April, 1994

Attest:

BRUCE LEHMAN

*Attesting Officer*        *Commissioner of Patents and Trademarks*